United States Patent
Burke et al.

(10) Patent No.: US 7,213,581 B2
(45) Date of Patent: May 8, 2007

(54) THROTTLE BODY WITH HYDROCARBON ADSORBER

(75) Inventors: David H. Burke, Victor, NY (US); Charles A. Iannone, West Henrietta, NY (US)

(73) Assignee: Delphi Technologies, Inc., Troy, MI (US)

( * ) Notice: Subject to any disclaimer, the term of this patent is extended or adjusted under 35 U.S.C. 154(b) by 138 days.

(21) Appl. No.: 11/032,259

(22) Filed: Jan. 10, 2005

(65) Prior Publication Data

US 2006/0150956 A1 Jul. 13, 2006

(51) Int. Cl.
 *F02M 37/20* (2006.01)
 *F02M 33/02* (2006.01)
(52) U.S. Cl. .................................. 123/516; 123/518
(58) Field of Classification Search ............. 123/516, 123/518, 519, 520, 198 D, 198 DB
 See application file for complete search history.

(56) References Cited

U.S. PATENT DOCUMENTS

| | | | | | |
|---|---|---|---|---|---|
| 3,477,210 | A | * | 11/1969 | Hervert | 96/144 |
| 3,541,765 | A | * | 11/1970 | Adler et al. | 96/138 |
| 3,572,013 | A | * | 3/1971 | Hansen | 96/138 |
| 3,678,663 | A | * | 7/1972 | Hansen | 96/141 |
| 4,261,717 | A | * | 4/1981 | Belore et al. | 96/112 |
| 4,276,864 | A | * | 7/1981 | Waschkuttis | 123/544 |
| 6,432,179 | B1 | * | 8/2002 | Lobovsky et al. | 96/296 |
| 6,464,761 | B1 | * | 10/2002 | Bugli | 96/135 |
| 6,505,610 | B2 | * | 1/2003 | Everingham et al. | 123/516 |
| 6,637,415 | B2 | * | 10/2003 | Yoshioka et al. | 123/518 |
| 6,692,551 | B2 | * | 2/2004 | Wernholm et al. | 95/146 |
| 6,692,555 | B2 | * | 2/2004 | Oda et al. | 96/134 |
| 6,698,403 | B2 | * | 3/2004 | Honda et al. | 123/520 |
| 6,699,310 | B2 | * | 3/2004 | Oda et al. | 96/132 |
| 6,736,871 | B1 | * | 5/2004 | Green et al. | 55/385.3 |
| 6,758,885 | B2 | * | 7/2004 | Leffel et al. | 96/134 |
| 6,786,199 | B2 | * | 9/2004 | Oda et al. | 123/399 |
| 6,835,237 | B2 | * | 12/2004 | Ishida | 96/135 |
| 6,959,696 | B2 | * | 11/2005 | Shears et al. | 123/516 |
| 6,976,477 | B2 | * | 12/2005 | Gimby et al. | 123/519 |
| 2005/0178368 | A1 | * | 8/2005 | Donahue et al. | 123/520 |

\* cited by examiner

*Primary Examiner*—Thomas Moulis
(74) *Attorney, Agent, or Firm*—Paul L. Marshall

(57) ABSTRACT

A hydrocarbon adsorber system in accordance with the invention comprising a carbon adsorber element installed in a throttle body of an internal combustion engine. The element may be installed on a wall or in a groove in the wall of the throttle throat at a location immediately upstream (outside) the throttle blade in the air flow direction, and/or an element may be installed on the downstream surface of the throttle blade itself. When an engine is shut down, the engine throttle normally remains slightly open. Any hydrocarbon emissions must pass through this slight opening, and applying carbon adsorbers to these locations takes advantage of proximity to such an opening, as any hydrocarbon emissions must pass close by the carbon adsorbers and thus have a much-increased probability of being adsorbed, in comparison with prior art more general carbon adsorption sites.

13 Claims, 3 Drawing Sheets

US 7,213,581 B2

THROTTLE BODY WITH HYDROCARBON ADSORBER

TECHNICAL FIELD

The present invention relates to internal combustion engines; more particularly, to devices for controlling hydrocarbon emissions from internal combustion engines; and most particularly, to adsorptive apparatus for preventing hydrocarbon leakage from the intake manifold of an internal combustion engine after engine shutdown.

BACKGROUND OF THE INVENTION

Gasoline-fueled motor vehicles have many sites from which hydrocarbons (HC) may evaporate into the environment, thereby contributing to the formation of smog. One such known site is the intake manifold of a carbureted or port-injected internal combustion engine. As HC emission regulations are tightened, a means is needed to prevent residual HC vapor from escaping from the intake manifold through the throttle valve assembly after engine shutdown. Known approaches have included, among others, closing off the intake and idle air with the throttle valve when the engine is shut off; adding adsorptive carbon grids in the intake air flow path between the air cleaner and the engine throttle plate; and lining the intake manifold, other air ducts, and/or the air cleaner with adsorptive carbon sheeting.

Employing an engine's electronic throttle control to close the intake at shut down may impair the desirable option of a so-called "limp home" mode in which a vehicle may be driven in event of a partial failure of the engine electronics control system. Systems with mechanical throttles not employing electronic throttle control typically do close the throttle at shut down, leaving a separate "idle air" passage open. In these systems, achieving a completely sealed manifold is difficult and expensive.

Adsorptive grids in the intake air flow path are undesirable as they are expensive to fabricate, brittle and therefore vulnerable to breakage, and inherently restrict the volume of intake air.

Carbon sheeting applied to inner surfaces of the manifold and air ducts is only partially successful because much HC laden air can escape the manifold without being brought into proximity with an adsorptive surface. Relatively large areas of carbon sheeting are required to ensure that an adequate quantity of HC comes into contact with the adsorber.

What is needed in the art is a means for increasing the efficiency of hydrocarbon adsorption during engine shutdown at the main air entrance to an engine.

It is a principal object of the present invention to reduce hydrocarbon emissions from a shut down internal combustion engine.

SUMMARY OF THE INVENTION

Briefly described, a hydrocarbon adsorber system in accordance with the invention includes a carbon adsorber element installed in a throttle body of an internal combustion engine. The element may be installed at or in the wall of the throttle body at a location immediately upstream (outside) the throttle blade in the air flow direction, and/or an element may be installed on a surface of the throttle blade itself. When an engine is shut down, the engine throttle valve normally remains slightly open. Any HC emissions must pass through this slight opening, and applying carbon adsorbers to these locations in the throttle valve itself takes advantage of such an opening, as any HC emissions must pass in close proximity to the carbon adsorbers and thus have a much-increased probability of being adsorbed, in comparison with prior art carbon adsorption sites.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
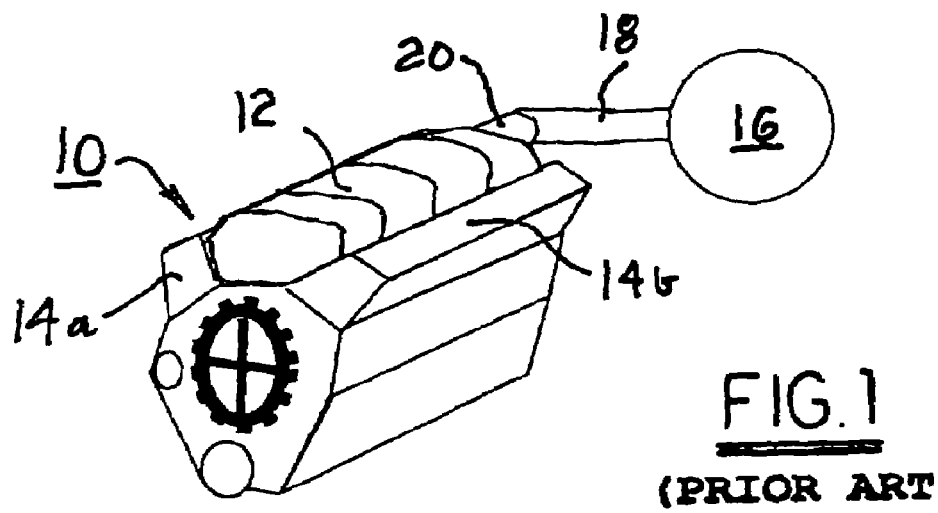
FIG. 1 is an isometric view of a prior art V-style internal combustion engine, showing the air intake, manifold, and throttle valve.

Referring to FIG. 1, a prior art V-style internal combustion engine 10 includes an intake manifold 12 for distributing air in known fashion to first and second engine heads 14a,14b. Air is drawn into engine 10 through an entrance air cleaner 16 and supply duct 18. An air intake throttle valve assembly 20 regulates the flow rate of air into the engine. In a default or engine shutdown position, throttle valve assembly 20 is nearly closed.

Figure 2:
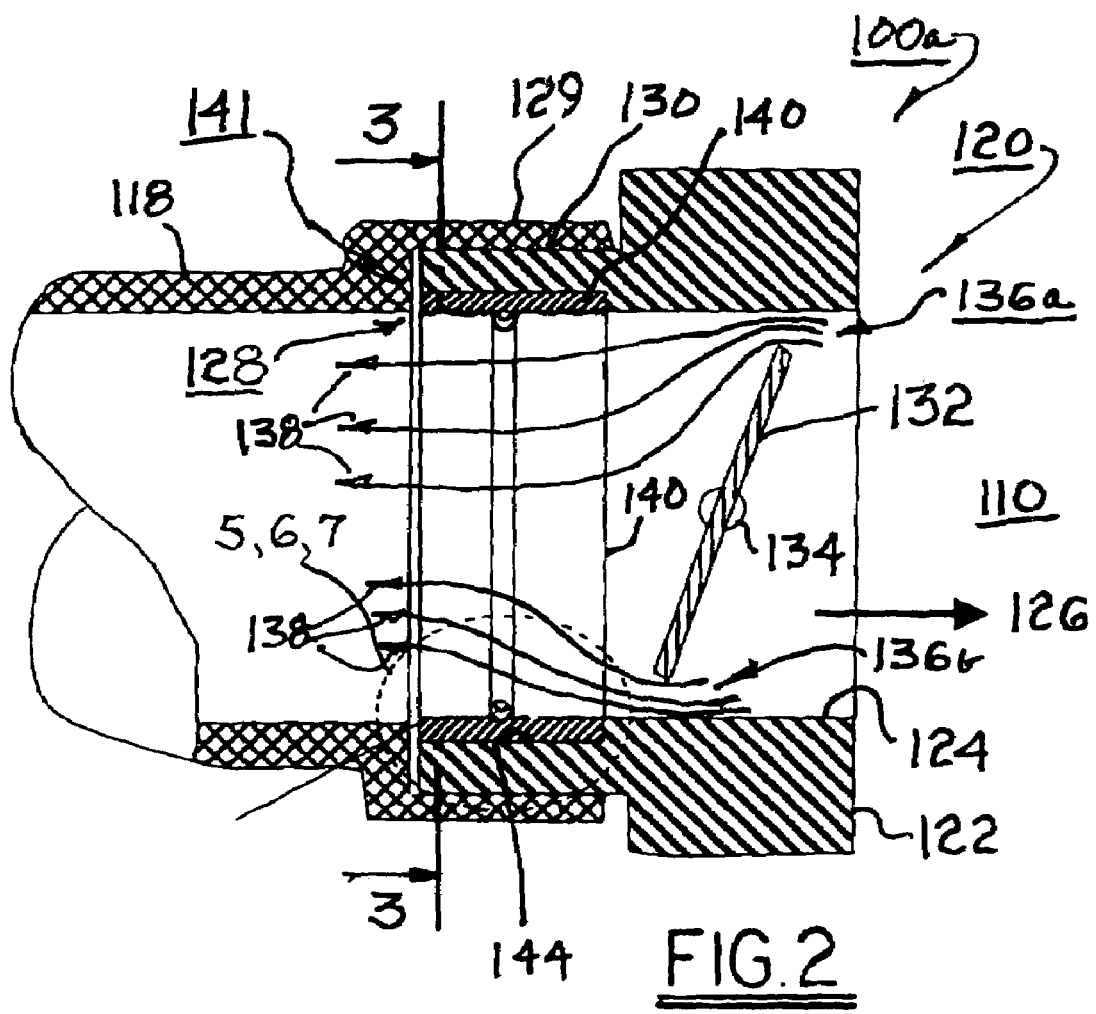
FIG. 2 is an elevational cross-sectional view of a first embodiment of a throttle valve in accordance with the invention, equipped for hydrocarbon adsorption.
Figure 3:
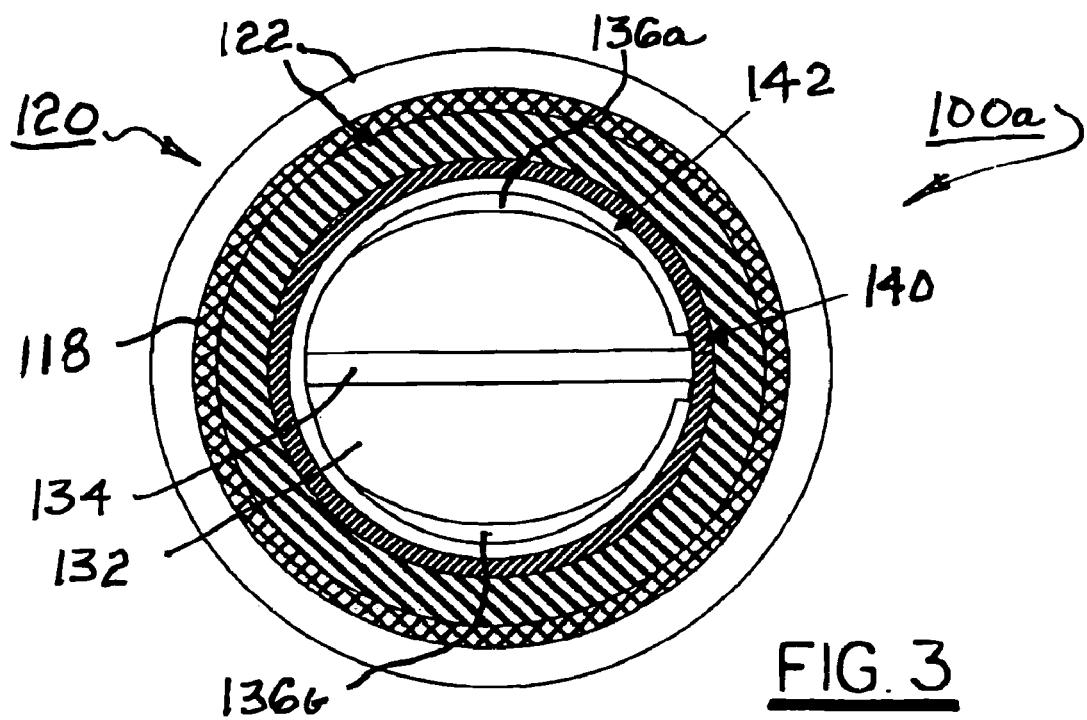
FIG. 3 is an elevational crossectional view of the throttle valve shown in FIG. 2, taken along line 3—3 therein.

Referring to FIGS. 2 and 3, a hydrocarbon adsorption system 100a, 100b in accordance with the invention comprises a throttle valve assembly provided with hydrocarbon adsorption means as described in detail below.

A throttle valve assembly 120 comprises a valve body 122 having a generally cylindrical bore or throat 124 extending through body 122 for admission of intake air 126 to an internal combustion engine 110. Preferably, air supply duct 118 is provided with an inner diameter similar to the diameter of throat 124 to provide a smooth air flow transition 128 therebetween. Preferably, supply duct 118 includes a female end 129 for receiving a male nipple 130 on throttle body 122 to create transition 128.

Throttle valve assembly 120 further includes a throttle blade 132 mounted on pivotable shaft 134 in known fashion, shaft 134 extending across throat 124 and through a bore in body 122. In engine shutdown mode with blade 132 in a typical prior art default position, blade 132 cooperates with throat 124 to create first and second crescent-shaped gaps 136a, 136b through which hydrocarbons 138 from engine 110 must migrate to allow evaporative emissions from the engine manifold to enter the environment.

Figure 5:
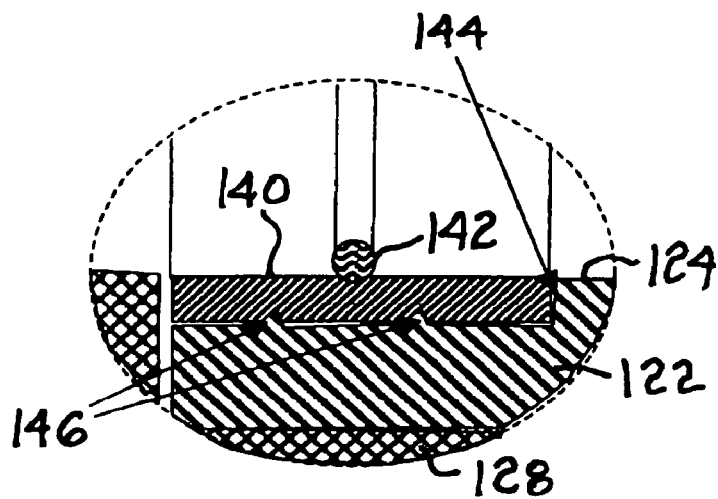
FIG. 5 is a detailed cross-sectional view taken in circle 5,6,7 in FIG. 2, showing inset of carbon adsorber into a wall of the throttle valve.

Referring to FIGS. 2, 3, and 5, a cylindrical element 140 of hydrocarbon-adsorptive sheet material is disposed along the wall of throat 124 adjacent throttle blade 132 and gaps 136a, 136b whereby the material is positioned immediately adjacent to the necessary migration path for hydrocarbon 138. In this respect, the positioning of hydrocarbon material differs from, and is superior to, all prior art arrangements of hydrocarbon-adsorptive sheet material in engine intake systems. This highly-efficient positioning permits the use of relatively little actual adsorptive material, and much less than in prior art schemes. Further, because the material is disposed right in the throttle body throat it is rapidly and efficiently stripped of adsorbed HC by incoming air when the engine is restarted. Preferably, an expansion ring 142 is provided for retaining cylindrical element 140 in place in throat 124 during engine use.

Element 140 may be formed readily from sheet activated carbon "paper" such as is available, for example, from MeadWestvaco, Stamford, Conn. USA. Still referring to FIGS. 2, 3, and 5, in a currently preferred first embodiment 141, an annular recess 144 is provided in throat 124 adjacent air duct 118 for receiving adsorptive element 140. The preferred position moves the element out of the direct air flow path, reduces air flow restriction caused by the element and ring, and enhances the positional stability of the element. Recess 144 may be further provided with one or more annular ridges 146 to assist in keeping element 140 in place. Although element 140 may be secured with adhesives, for example, an epoxy glue, in the preferred embodiment the element is retained mechanically solely by ring 142.

Figure 6:
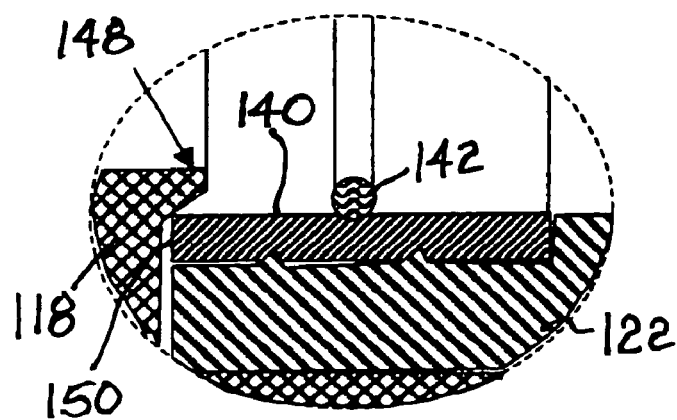
FIG. 6 is a detailed cross-sectional view taken in circle 5,6,7 in FIG. 2, showing an optional upstream retaining lip.
Figure 7:
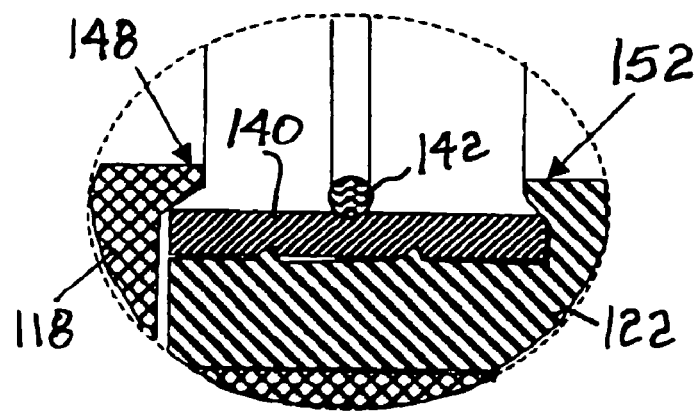
FIG. 7 is a detailed cross-sectional view taken in circle 5,6,7 in FIG. 2, showing an optional upstream retaining lip and downstream retaining lip.

Referring to FIG. 6, optionally a first annular retaining lip 148 may be provided on air duct 118 to protect the leading edge 150 of element 140 from dislodgement by high airflow when engine 110 is running at high speed. Referring to FIG. 7, a second annular retaining lip 152 optionally may be provided on throttle body 122 as to further lock element 140 in recess 144.

Note that in the preferred embodiment 141, the carbon adsorptive element 140 is located on the throttle body outside of the throttle blade. Of course, within the scope of the invention, the element could be disposed in throat 124 at an equivalently functional position (not shown) on the manifold side of the throttle blade; however, the preferred position is as shown because the heat and oils in the manifold could permanently damage the adsorptive material.

Figure 4:
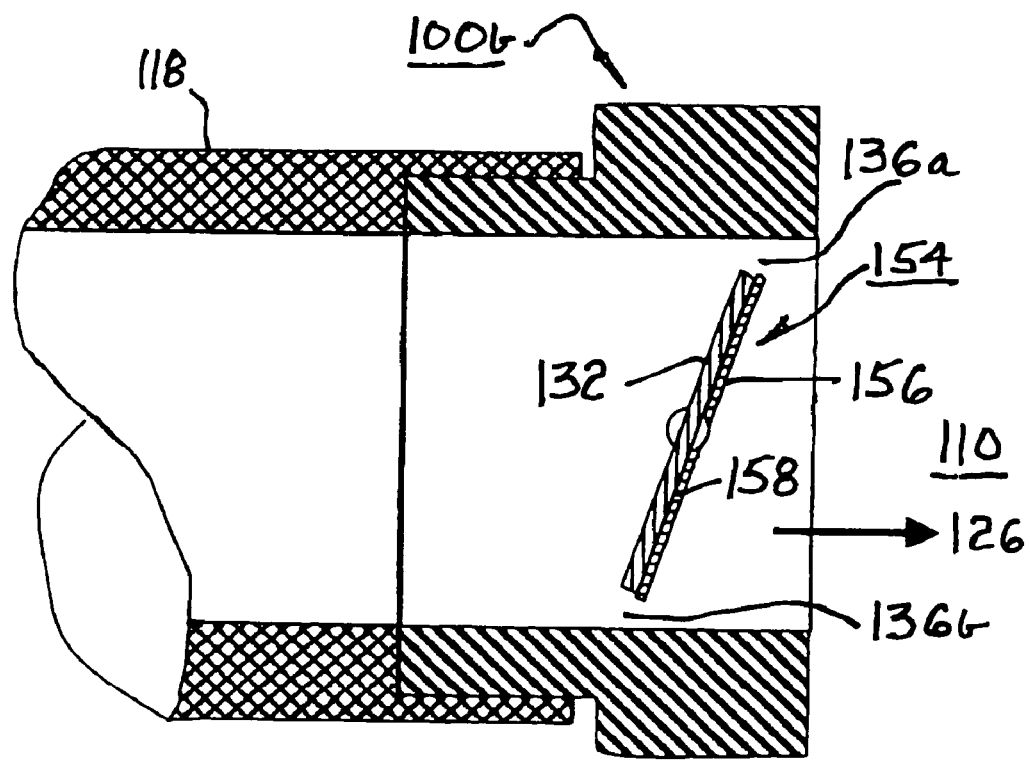
FIG. 4 is an elevational cross-sectional view of a second embodiment of a throttle valve in accordance with the invention, equipped for hydrocarbon adsorption.

Referring to FIG. 4, in a second embodiment 154, a planar element 156 of carbon adsorber, which may or may not be the same material as is used for first embodiment 141, is attached, as by epoxy or riveting, to throttle blade 132 on the manifold side 158 thereof. Alternatively, a hydrocarbon adsorber may be coated directly to blade 132. When engine 110 is operational and high volumes of combustion air are required, throttle blade 132 is rotated on shaft 134 to let the air in, thus moving element 156 out of the way. When engine 110 is shut down, throttle blade rotates to the shown position, creating crescent-shaped gaps 136a, 136b as in first embodiment 141 through which escaping hydrocarbon must pass. As in first embodiment 141, the carbon adsorber, being positioned directly on the throttle blade, is placed very near to the HC escape path.

Although effective on many engines, this embodiment is less suitable for engines having a throttle blade subjected to oil mist during operation, as the oil will coat the adsorber and render it ineffective at adsorbing hydrocarbon when the engine is subsequently shut down.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A system for adsorbing hydrocarbons residual in an intake manifold of an internal combustion engine during shutdown periods of the engine, comprising:
    a) a throttle valve assembly disposed at an air entrance to said intake manifold, said throttle valve assembly including a valve body having a throat formed therethrough and a throttle blade disposed on a pivotable shaft in said throat, said throttle blade cooperating with said throat to define at least one gap during the shutdown periods of the engine; and
    b) hydrocarbon-adsorptive material disposed on said throttle valve assembly in a wall of said throat adjacent said throttle blade and said at least one gap, wherein said hydrocarbon-adsorptive material is positioned immediately adjacent to a migration path for the hydrocarbons through said at least one gap during the shutdown periods of the engine.

2. A system in accordance with claim 1 wherein said wall of said throat is opposite said throttle blade from said intake manifold.

3. A system in accordance with claim 2 wherein said assembly further comprises means for retaining said hydrocarbon-adsorptive material against said wall.

4. A system in accordance with claim 2 wherein said wall is provided with an annular recess and said hydrocarbon-adsorptive material is disposed in said annular recess.

5. A system in accordance with claim 4 wherein said annular recess includes at least one annular lip.

6. A system in accordance with claim 1 wherein said hydrocarbon-adsorptive material includes activated carbon.

7. A system in accordance with claim 6 wherein said hydrocarbon-adsorptive material is a sheet stock formed from activated carbon.

8. A system in accordance with claim 7 wherein said sheet stock is formed into a cylindrical element.

9. An internal combustion engine having an air intake manifold and a throttle valve assembly disposed on the manifold, said throttle valve assembly including a valve body having a throat formed therethrough and a throttle blade disposed on a pivotable shaft in said throat, said throttle blade cooperating with said throat to define at least one gap when the engine is shut down, wherein said throttle valve assembly includes surface portions immediately proximate said throttle blade and said at least one gap covered by hydrocarbon-adsorptive material for capturing hydrocarbons residual in said intake manifold in a migration path through said at least one gap when said engine is shut down.

10. A system in accordance with claim 1 wherein said at least one gap is crescent-shaped.

11. A system in accordance with claim 1 further comprising an expansion ring for retaining said hydrocarbon-adsorptive material against said wall.

12. A system in accordance with claim 4 wherein said annular recess provides at least one annular ridge.

13. A system for adsorbing hydrocarbons residual in an intake manifold of an internal combustion engine during shutdown periods of the engine, comprising:
    a) a throttle valve assembly disposed at an air entrance to said intake manifold, said throttle valve assembly including a valve body having a throat formed therethrough and a throttle blade disposed on a pivotable shaft in said throat; and b) hydrocarbon-adsorptive material disposed on said throttle valve assembly in a wall of said throat adjacent said throttle blade, wherein said wall of said throat is opposite said throttle blade from said intake manifold, wherein said wall is provided with an annular recess and said hydrocarbon-adsorptive material is disposed in said annular recess, and wherein said annular recess includes at least one annular lip.

* * * * *